United States Patent Office 3,402,342
Patented Sept. 17, 1968

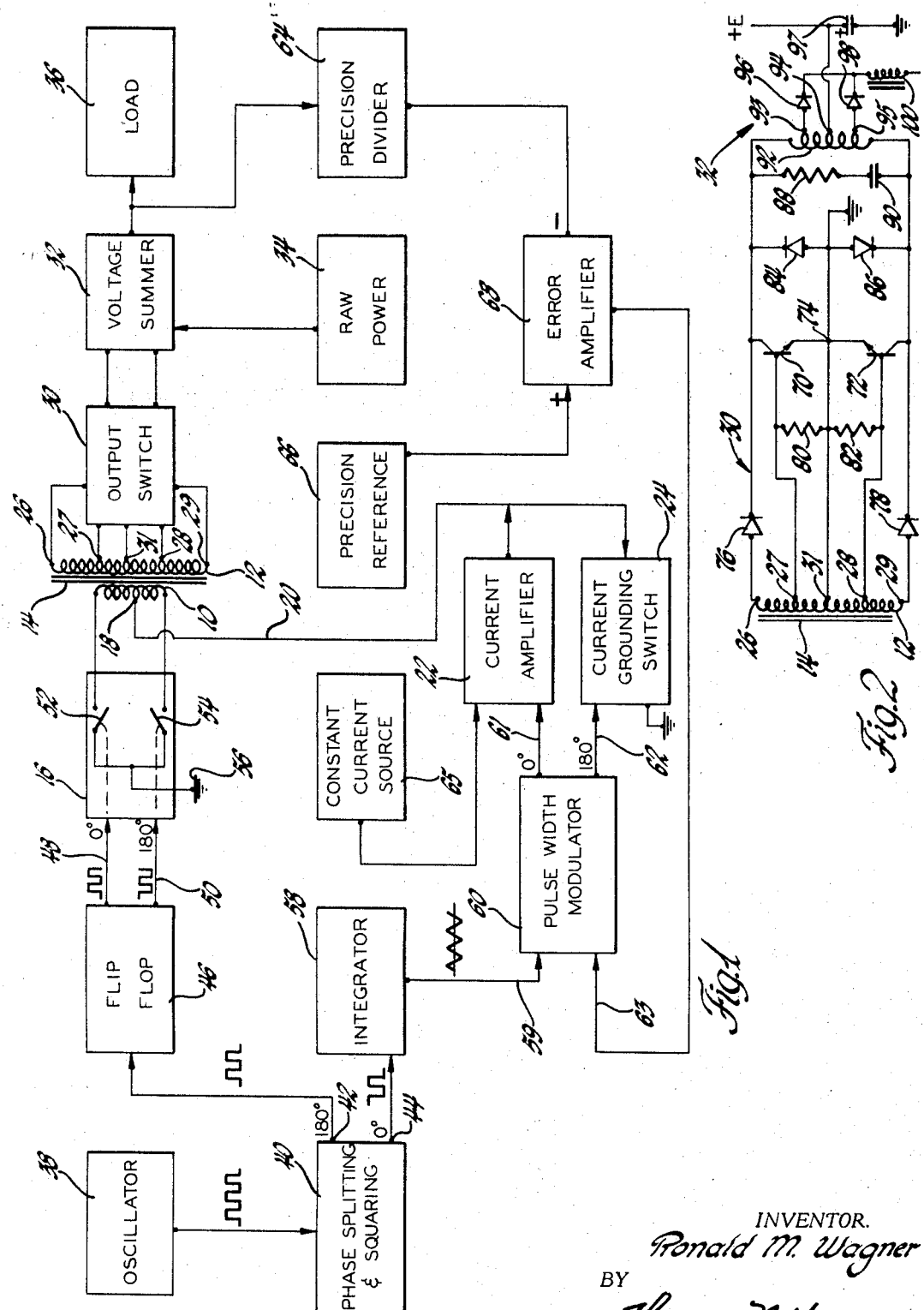

3,402,342
DC POWER SUPPLY EMPLOYING VARIABLE WIDTH PULSE REGULATION
Ronald M. Wagner, Greendale, Wis., assignor to General Motors Corporation, Detroit, Mich., a corporation of Delaware
Filed Feb. 16, 1966, Ser. No. 527,911
9 Claims. (Cl. 323—18)

ABSTRACT OF THE DISCLOSURE

A closed loop regulated DC power supply in which voltage control is accomplished by applying voltage pulses of selected duration to a load. The pulses are generated by means of a transformer having a split primary, the portions of which are placed in separate closed circuits alternately. Current pulses of selected duration are driven through the primary portions in a ratio determined by output voltage comparison to produce a secondary voltage related to the deviation of the raw supply voltage from the desired value. Output circuit means are connected between the secondary winding and a load to add increments of voltage to the raw supply to restore the desired value.

Summary of the invention

This invention relates to regulated DC power supplies and more particularly to power regulator apparatus including a split primary transformer and means for pulsing the primary with current of duration and polarity selected to produce a secondary signal suitable for controlling an output switching operation.

According to the invention, regulatable DC power for application to an electrical load is produced by adding pulses of selected duration to the output of an unregulated power source, such as a battery. This is accomplished by means of a switching arrangement which operates under the control of signals produced in a transformer having a split primary and a secondary and means for injecting current pulses of selected polarity and duration into a center tap of the primary in timed relation with the establishment of respective circuits of opposite sense through respective portions of the split primary.

In a particular embodiment of the invention, the secondary signals from the split primary transformer control the conductivity of two switching transistors which operate in a non-saturating mode. Each of the transistors controls current in a circuit to produce voltage pulses of regulatable duration to be effectively added to a raw voltage source to bring the raw voltage into correspondence with a desired output voltage level.

The invention may, of course, include feedback means for continually comparing the power delivered to the load with a reference value. The error signal resulting from this comparison may be employed to provide automatic or self-controlling regulation.

The invention may be best understood by reference to the following description of a specific embodiment thereof to be taken with the accompanying drawings of which:

FIGURE 1 shows the specific embodiment primarily in block diagram form; and

FIGURE 2 shows a portion of FIGURE 1 in schematic detail.

Referring to the drawing, the invention embodied therein is shown to include a transformer having a primary winding 10 and a secondary winding 12 disposed on a common transformer core 14. The primary winding 10 is connected across a switching unit 16 which, as later described, is operable to establish, in alternate fashion, circuits of opposite sense through respective portions of the primary winding 10. The primary winding 10 is also provided with a center tap 18 which effectively splits the winding into upper and lower portions as shown in the drawing.

Center tap 18 is connected by way of a conductor 20 to a high impedance current amplifier 22 which, as later described, issues current pulses of selected duration to be injected into the circuits which are established through the respective portions of the primary winding 10 through the center tap 18. Primary winding 10 is also connected by way of conductor 20 to a current grounding switch 24 which serves to ground the center tap 18 during those periods when no current is being supplied by current amplifier 22.

Secondary winding 12 is provided with four spaced taps 26, 27, 28 and 29 and a center tap 31 each of which is connected to a different input of an output switch 30. The output switch, as best described with reference to FIGURE 2, serves to generate electrical pulses of selectable duration under control of the secondary signals for summation at summer 32 with the output of an unregulated power supply 34. The total voltage is then applied to an electrical load 36. Source 34 may, for example, be a battery subject to output power fluctuations not compatible with the load application requirements.

As shown in FIGURE 1, the switching circuit 16 is controlled so as to establish in alternate fashion two electrical circuits through the primary winding 10; the first circuit extending from the center tap 18 through the upper portion of the primary winding 10 and the second circuit from the center tap 18 through the lower portion of primary winding 10 as shown in FIGURE 1. Upon establishment of the circuits through primary 10, current amplifier 22 supplies each circuit with a pulse of constant magnitude current and variable duration. Injection of current of constant polarity through the upper and lower portions of primary 10 produces secondary signals of opposite polarity which operate output switch 30 in the manner indicated above.

Timing means are provided to synchronize the operations of the switching unit 16 with the current amplifier 22 and grounding switch 24. This timing means includes an oscillator 38 which serves as a basic timing signal source or clock. The output of oscillator 38 is connected to a phase splitter and waveform squaring circuit 40 having two outputs 42 and 44. The phase splitting function of circuit 40 produces a square wave signal on each of the outputs 42 and 44 at a frequency equal to that of the input signal. However, output 42 is displaced in phase 180° from the appearing at output 44. The signal on output 42 is connected to a bistable multivibrator or flip-flop circuit 46. The flip-flop 46 has two outputs 48 and 50 on which signals appear at a frequency of one-half that of the input. Output 48 is operatively connected to control a first switch 52, and output 50 is operatively connected to control the condition of a second switch 54, both switches being part of unit 16 as shown. Switch 52, when closed, completes an electrical circuit from center tap 18 through the upper portion of primary 10 to ground 56. In a similar fashion, switch 54, when closed, completes a circuit from center tap 18 through the lower portion of primary winding 10 to ground 56. Since the output of flip-flop 46 comprises two complementary waveforms, it can be seen that the switches 52 and 54 are closed in an alternating or complementary fashion. It will be appreciated by those skilled in the art that the switches 52 and 54, while shown being of a mechanical nature, may comprise electronic apparatus such as transistors.

Referring to the phase splitting and squaring circuit 40, output 44 is connected to an integrator circuit 58 which effectively integrates the square wave input thereto and provides a triangular waveform output as indicated in FIGURE 1. This output is supplied to the input 59 of a pulse width modulator 60 having two complementary outputs 61 and 62. Modulator 60 produces complementary, i.e., opposite phase signals on outputs 61 and 62 which are normally of balanced relation, but which vary in balance or symmetry in accordance with the DC value of a signal applied to the input 63 of modulator 60. Output 61 is connected to the current amplifier 22 to effectively gate the current from a constant current source 65. This source 65 provides unidirectional current of substantially constant magnitude irrespective of load voltage which current is divided into pulses of variable duration by the combined action of pulse width modulator 60 and amplifier 22. These pulses are applied through current amplifier 22 to the center tap of primary winding 10. The complementary output signal at 62 is applied to a grounding switch 24 to ground center tap 18 whenever no current pulses are supplied thereto.

In operation, the two complementary waveforms appearing at 48 and 50 provided by flip-flop circuit 46 serve to alternately close switches 52 and 54. The closure of the switches establishes circuits through the primary winding 10 in opposite directions but for equal periods of time. Current pulses from the combination of source 65, width modulator 60 and current amplifier 22 may be applied to each of the established circuits for a duration calculated to produce a secondary voltage pattern across winding 12 which via switch 30 effects regulation of the voltage applied to load 36; for example, if the voltage applied to load 36 is low in amplitude, it is desirable to generate a voltage pulse from switch 30 of increased duration. The pulse duration modulation is controllable through the magnitude of the signal at input 63. The current injection is inherently synchronized with the closure of switches 52 and 54 by virtue of the common electrical ancestry of flip-flop 46 and width modulator 60 in the basic timing oscillator 38.

Referring to FIGURE 2, a more detailed description of the output switch 30 of FIGURE 1 is given. Switch 30 comprises a pair of NPN type transistors 70 and 72. The input or base electrodes of transistors 70 and 72 are connected to the intermediate taps 27 and 28, respectively, of secondary winding 12. The emitter electrodes are commonly connected to a point 74 which is held at a reference potential. The upper secondary tap 26 is connected through a diode 76 to the collector electrode of transistor 70 and lower secondary tap 29 is connected through diode 78 to the collector of transistor 72. Base bias resistors 80 and 82 are connected between center tap 31 and the base inputs of transistors 70 and 72, respectively. Diodes 84 and 86 are connected across the emitter-collector circuits of transistors 70 and 72, respectively. The output of the arrangement described above is connected across a filter circuit comprising the series combination of resistor 88 and capacitor 90.

The series circuit 88, 90 is connected in parallel with an auto-transformer winding 92 having three spaced taps 93, 94 and 95. Center tap 94 is connected to the raw power supply 34 indicated in FIGURE 2 as +E as well as to ground through capacitor 97. The taps 93 and 95 which straddle tap 94 are connected through summing and rectifying diodes 96 and 98, respectively. The diodes 96 and 98 are connected together at the cathodes thereof and then through an inductor 100 to the load 36 as indicated in FIGURE 1.

In operation, the output switch 30 produces unipolar voltage pulses of variable duration which are effectively added to the output of power supply 34 for application to the load 36. When current is injected into the center tap 18 of transformer primary 10, the current step up action of the transformer produces a current in the secondary 12 which turns on either transistor 70 or 72 depending on which of the switches 52 or 54 is closed. Assume for discussion that switch 52 is closed such that the current injection turns on transistor 70. A current path is then completed from the source (+E) through the upper portion of winding 92 and through transistor 70 in series relationship. This causes diode 98 to conduct while back biasing diode 96. The load now receives a current pulse to restore the power value thereof to a desired level. The energy storing action of inductor 100 is such that a smoothing of the pulses is produced. For the portion of current flow which overlaps the turning off of transistor 70, current flows through both diodes 96 and 98.

It is apparent that turning on transistor 72 produces an effect which corresponds to that described above except that diode 96 conducts a pulse of energy to the load 36.

In the case of current flow through either diode 96 or 98, it will be appreciated that the raw supply 34 produces the energy which is pulsed through diodes 96 and 98 for regulation purposes. The circuit described, in effect, takes current from the supply 34 to form the regulatable pulses and then adds the pulses back to the raw output. Since the supply 34 may be considered as an infinite source of current, but subject to voltage sag, there is no electrical inconsistency presented.

Since it is desirable to operate transistors 70 and 72 in an unsaturated mode, diodes 76 and 78 are provided to drain off excess current through the collector connections of the transistors. Accordingly, taps 27 and 28 are positioned to produce the proper base drive currents to operate transistors 70 and 72 in an unsaturated mode.

When the constant current injection to center tap 18 is removed and switch 24 grounds the tap 18, the primary short circuit is reflected across transformer 14 to the base-emitter circuits of the transistors 72 and 74. This short circuit serves to remove the charge rate in the base-emitter junction of the previously conducting transistor terminating conduction as rapidly as possible.

This circuit arrangement ensures stable, fast unsaturated operation of switch transistors 70 and 72 and provides large tolerances on the input (base) current drive supplied by the primary current injection technique.

The embodiment of the invention shown in FIGURE 1 is especially adapted for operation in a servo or feedback controlled fashion. This mode of operation is accomplished by the provision of a precision voltage divider 64 which provides an output corresponding to a sample of the voltage applied to load 36. The output voltage provided by divider 64 is compared to the output of a precision voltage reference 66 in a comparator and error amplifier 68. The output of error amplifier 68 is a DC signal corresponding in amplitude and polarity to the difference between the signals received from divider 64 and reference 66. This DC signal is applied to input 63 of pulse width modulator 60. Specifically, this latter circuit, which may include a simple adder and a differential amplifier, serves to combine the error signal with the triangular waveform received from integrator 58 so as to either raise or lower the DC value of the triangular waveform and vary the balance or symmetry of the complementary signals appearing at 61 and 62 in accordance with the error signal at 63. By virtue of the changing of this signal, the width of the current pulses delivered through amplifier 22 to the input center tap 18 of primary winding 10 is varied in accordance with the character of the voltage which must be added to the output of unregulated supply 34 to reduce the error signal from amplifier 68 to zero. At the same time, the output from width modulator 60 which is delivered at current grounding switch 24 is reversed in phase from that signal which is applied to current amplifier 22. Because of this inverse phase relationship, the signal to grounding switch 24 is effective to close a circuit through that switch whenever there are no current pulses being delivered to center tap 18. Accordingly, the primary winding 10 is effectively grounded through switch 24 providing an impedance reflection across the transformer the effect of which has been described above.

I claim:

1. In apparatus for providing regulated power to a load, a transformer having first and second primary winding portions joined by a center tap, and a secondary winding, switch means for alternately establishing separate electrical circuits from the center tap through the first and second primary winding portions for respective halves of a fixed period cycle, a source for applying unidirectional current pulses of constant amplitude to the center tap, regulator means associated with the source for varying the duration of the current pulses over respective portions of each of the half cycles in accordance with the desired character of a voltage to be applied to the load, and output circuit means connected between he secondaryt winding and the load.

2. Apparatus as defined in claim 1 including an electrical load, means for comparing at least a portion of a voltage produced across the load to a reference value and for generating an error signal representing the deviation of load voltage from a desired value, and means for operatively applying the error signal to the regulatable source for modulating the width of the current pulses in a manner tending to reduce the error signal to zero.

3. Apparatus as defined in claim 1 wherein the output circuit means includes first and second transistors connected to produce a variable voltage to be applied to the load, means connecting first and second intermediately located taps on the secondary winding to the first and second transistors, respectively, for rendering the transistors individually conductive according to the polarity of the second signal, and circuit means for disposing of current in the secondary winding in excess of that required to render the transistors conductive.

4. Apparaus as defined in claim 3 further including a source of unregulated power, summing means connected to add the variable voltage to the output of the unregulated power source and to produce a regulated output voltage, and means connecting the output voltage to the load.

5. Apparatus as defined in claim 4 including means for comparing at least a portion of the output voltage to a reference value and for generating an error signal representing the difference therebetween, and means for applying the error signal to the regulatable power source for modulating the width of current pulses in a manner tending to reduce the error signal to zero.

6. Apparatus for providing regulated power to a load including: a load, a transformer having first and second primary winding portions joined by a center tap, and a secondary winding, first and second circuit means including first and second switch means, respectively, connected to respective primary winding portions for completing electrical circuits therethrough when the switch means are closed, timing means including a source of synchronizing signals operatively connected to the first and second switch means for alternately closing the switch means for substantiallly equal periods of time, a regulatable source of DC current pulses connected to the center tap, and circuit means including regulator means connected to the said regulatable source for regulating the duration of the current pulses produced by the regulatable source in accordance with variations in the voltage measured across the load, the timing means being connected to the regulator means for synchronizing the occurrence of the current pulses with the closing of the switch means, and output circuit means connected between the secondary winding and the load for developing a variable voltage to be applied to the load.

7. Apparatus as defined in claim 6 wherein the output circuit means comprises a pair of transistors of like conductivity type, means connecting a portion of the secondary winding to the input of each of the transistors, and means for disposing of excess current in the secondary thereby to prevent saturation of the transistors.

8. Apparatus as defined in claim 7 further including third circuit means connected between the center tap and ground, the third circuit means including third switch means synchronized with the regulator means for closing the third switch means whenever the regulatable source is turned off.

9. Apparatus as defined in claim 8 further including a source of unregulated power, and summing means connected intermediate the output circuit means and the unregulated source for adding the variable voltage to the unregulated power for combined application to the load.

References Cited

UNITED STATES PATENTS

| | | | |
|---|---|---|---|
| 2,959,745 | 11/1960 | Grieg. | |
| 2,968,738 | 1/1961 | Pintell. | |
| 3,075,138 | 1/1963 | Croft et al. | 323—45 |
| 3,325,716 | 6/1967 | Gomi | 321—2 |
| 3,343,062 | 9/1967 | Mesenhimer | 321—2 |
| 3,350,620 | 10/1967 | Barron | 321—2 |

LEE T. HIX, *Primary Examiner.*

A. D. PELLINEN, *Assistant Examiner.*